United States Patent Office 3,849,457
Patented Nov. 19, 1974

3,849,457
PREPARATION OF CARBOXYLIC ACIDS BY
HYDROGENOLYSIS OF ESTERS
Werner O. Haag, Trenton, and Darrell Duayne Whitehurst, Titusville, N.J., assignors to Mobil Oil Corporation
No Drawing. Continuation-in-part of abandoned application Ser. No. 794,342, Jan. 27, 1969. This application Mar. 15, 1972, Ser. No. 235,090
Claims priority, application Great Britain, Dec. 29, 1969, 63,055/69
Int. Cl. C08h 17/36
U.S. Cl. 260—413
27 Claims

ABSTRACT OF THE DISCLOSURE

A method is provided for the hydrogenolysis of esters and lactones to carboxylic acids by reaction with hydrogen in the presence of a hydrogenation/acid-acting catalyst combination.

CROSS-REFERENCES TO RELATED APPLICATIONS

Catalysts useful in the invention are disclosed, together with their preparation, in the following copending applications: Ser. No. 647,221, filed June 19, 1967, now abandoned; Ser. No. 647,222, filed June 19, 1967, now abandoned; Ser. No. 672,007, filed Oct. 2, 1967, now U.S. Pat. No. 3,578,609; Ser. No. 672,009, filed Oct. 2, 1967, now abandoned, and Ser. No. 672,011, filed Oct. 2, 1967, now abandoned.

This application is a continuation-in-part of our copending U.S. Application Ser. No. 794,342, filed Jan. 27, 1969, now abandoned.

BACKGROUND OF THE INVENTION

1. The field of the invention comprises the selective catalytic hydrogenolysis of esters, including intramolecular esters or lactones, to form carboxylic acids in good yields without reducing the carbonyl group of the ester.

2. The catalytic reduction of esters and lactones by hydrogen is generally known, the usual product being alcohols and diols, respectively. Hydrogenolysis of the ester or lactone, i.e., cleavage of the carbon-oxygen bond without reduction of the carbonyl group, as illustrated by the equations below, is much more difficult and is known in only a few special cases, such as the hydrogenolysis of certain activated esters in the presence of platinum. By "activated," it is meant that the carbon-oxygen single bond of the ester or lactone is attached directly to one of the following groups: vinyl, allyl, benzyl, or phenyl, or is incorporated into a highly strained ring system such as in a beta-lactone. The hydrogenolysis of esters of tertiary alcohols over a combination of a soluble weak acid and a hydrogenation catalyst has been reported; and a combination of a soluble strong acid and a hydrogenation catalyst has been used to convert esters and lactones to ethers with no hydrogenolysis. But no general procedure for the hydrogenolysis of non-activated esters and lactones selectively to carboxylic acids in the absence of soluble acids is known. And, so far as is known, no method has been reported which employs the dual functional catalyst system described below.

SUMMARY OF THE INVENTION

The selective hydrogenolysis of an ester, including a lactone, to a carboxylic acid in good yields may be carried out under relatively mild conditions in the presence of a dual functional catalyst system comprising a hydrogenation component and an acid-acting component preferably selected from an ion exchange resin and a crystalline aluminosilicate molecular sieve. The hydrogenation component may be a metal of Groups I-B, II-B, III-B, IV-B, V-B, VI-B, VII-B, and VIII of the periodic system, or a compound of one of said metals. The resulting catalyst material or system is insoluble in conventional liquids and functions as a heterogeneous catalyst. Separation of reaction products may be accomplished readily by conventional filtration, decantation, centrifugation, etc. Excellent conversions and selectivities are obtainable.

DESCRIPTION OF THE SPECIFIC EMBODIMENTS

The esters utilized in this invention include both open-chained esters and internal esters, or lactones. (The terms "esters" and "lactones" may be used separately hereinafter for the purpose of discussing each type respectively, or for convenience the generic term "ester" may be used for both forms.) The esters of this invention are those having in its molecule at least one occurrence, and preferably from 1 to 6 occurrences, of the group

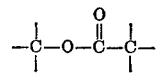

wherein the dangling valences on the two carbon atoms are attached to hydrogen atoms or other non-organyl groups or molecules, or to organyl groups and substituted organyl groups, and two of the said dangling valences on the left-hand carbon atom may also be an olefinic or aromatic double bond, and further wherein one dangling valence on both carbon atoms may be interconnected with each other through one or more intermediate atoms.

Surprisingly, the selective hydrogenolysis of this invention is understood to open the bond between the left hand carbon atom and the oxygen atom to produce the following:

component in the product may be a separate hydrocarbon or substituted hydrocarbon compound when the ester is reacted, or a linked carbon atom of the said carboxylic acid product when the lactone is reacted.

More specifically, the hydrogenolysis reactions contemplated by the invention may be illustrated by the following equations:

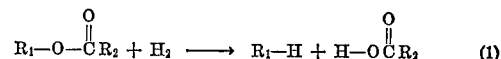

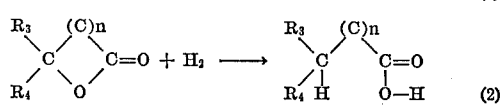

where $n$ has a value of from 1 to 20 or 30 or more, but preferably 1 to 12, and where $(C)_n$, $R_1$, $R_2$, $R_3$, and $R_4$ are described below. As shown in equation (1), the ester is converted to an acid and an alkane without reduction of the carbonyl group; and in equation (2) a lactone is converted to an acid without carbonyl reduction. It is apparent that the product in equation (2) may have preferably 3 to about 14 carbon atoms in the chain and may be a straight or branched chain acid. The product in equation (1) may be a straight or branched acid depending on the value of $R_2$. With conversions extending to 99% and selectivities as high as 98%, high yields of product, going to 90% or more, may be realized.

Turning now to the specific esters which may be reacted according to the invention, they include aliphatic esters wherein $R_1$ of the formula

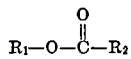

is an alkyl, alkenyl, or cycloalkyl or substituted derivative thereof having 1 to any desired number of carbons. Preferably, the alkyl, alkenyl or cycloalkyl groups having at least 2 carbons, and especially those in which the number 2 or beta carbon is substituted by at least one hydrogen atom, i.e.

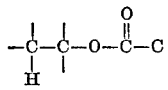

$R_1$ may be straight or branched chain, substituted or unsubstituted, saturated or unsaturated. The $R_2$ group may be the same as or different from $R_1$. Examples of aliphatic esters are methyl formate, butyl valerate, secondary butyl acetate, octyl octoate, hexenyl decanoate, methyl pyruvate, ethyl acetoacetate, ethyl levulinate, ethyl malonate, various alkyl esters of sulfosuccinic acid, butyl acrylate, hexyl methacrylate, heptyl crotonate, methyl-alpha-chloroacrylate, cyclohexyl acrylate, ethyl octen-3-oate, methyl linoleate, methyl linolenate, ethyl oleate, and mono-, di-, and triglycerides, etc. Cycloaliphatic esters are suitable, comprising those wherein $R_1$ may vary as described and $R_2$ may be a saturated or unsaturated cycloalkyl group, examples of which are methyl ester of cyclohexane carboxylic acid, dodecyl abietate, dodecyl hydroabietate, etc. Also of use are esters of polyhydric alcohols, such as alkylene glycols, and glycerols, including propylene glycol diacetate and sorbitan laurate, etc., and of polymeric alcohols, including alkylpolyethylene glycol caproates, caprates, stearates, benzoates, etc., and polyethylene glycol dicaproate, dilaurate, distearate, and also glycerol tristearate, etc. Of interest in these first two groups of esters are the naturally occurring mixtures of esters found in waxes, fats and oils of vegetable or animal origin. Esters of waxes are those of high molecular weight monohydric alcohols and fat acids; carnauba, spermaceti, degras and the like are understood to consist of esters of $C_{24}$ to $C_{34}$ alcohols and acids. Fats and oils, such as soybean, coconut, corn, lard, tallow, oiticica, neat's foot, cottonseed, peanut and the like, contain glycerides, derived from a glycerol and an acid:

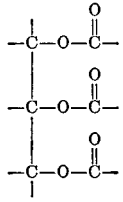

in which the acids may be saturated or unsaturated, including capric, caprylic, caproic, lauric, palmitic, stearic, oleic, linoleic, eleostearic, ketoeleostearic and the like.

Aromatic esters are another group of useful esters wherein $R_1$ of the foregoing formula may be aryl or substituted aryl or aralkyl or aralkenyl or may vary as previously described and $R_2$ may be an aryl, alkaryl, or aralkyl group like phenyl, naphthyl, anthryl, tolyl, xylyl, ethylphenyl, benzyl, trityl, beta-phenethyl, cumyl, cuminyl, cinnamyl, styryl, thenyl, etc. Group $R_2$ may also be a heterocyclic radical, as illustrated by pyridyl, pyrazolyl, pyrrolyl, furfuryl, indolyl, imidazolyl, oxazolyl, thiazolyl, thienyl, etc. Some examples of these esters are pentadecyl benzoate, tetradecyl salicylate, benzyl benzoate, ditert-butyl phthalate, methyl-alpha-toluate, ethyl cinnamate, ethyl phenylacetate, furfuryl benzoate.

Esters of dicarboxylic acids are also suitable in this invention. Esters derived from malonic, succinic, glutaric, adipic, pimelic, suberic, azelaic, cyclohexyl dicarboxylic acid, and the like may be used. Phenyl and naphthyl dicarboxylic acid esters are also suitable in this invention. Heterocyclic dicarboxylic acid esters, such as those of quinolinic acid, are also suitable.

Particularly useful are non-activated esters, since no general method for their hydrogenolysis is known. The advantages of the invention are of course realizable with activated esters, comprising those wherein the carbon-oxygen single bond, i.e., the bond between $R_1$ and O, is attached directly to an activating group, usually an unsaturated group, such as vinyl, allyl, phenyl, benzyl, etc. Examples of activated esters are allyl caproate, allyl linoleate, phenyl butyrate, vinyl stearate, diallyl phthalate, diallyl maleate, vinyl acetate, propynyl acetate, etc.

Any of the foregoing groups which represent $R_1$ and/or $R_2$ may be substituted by one or more radicals which are inert to, i.e. do not interfere with the reaction, such as keto, hydroxy, carbonyl, halogen, carboxy, cyano, alkoxy, mercapto, alkylmercapto (RS—), amino, phosphorusdithio (—PSS—) and the like.

In the case of the lactones of the formula

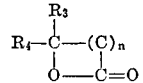

where $n$ equals 1 to 12, the $(C)_n$ moiety may be substituted by one or more hydrocarbyl groups (defined below), or by hydrocarbyl-containing groups, or by heterocyclic radicals, or by any of the foregoing inert radicals described in the preceding paragraph. The $R_3$ group may be equal to any of the groups designated for $R_1$ or $R_2$, i.e., hydrogen, alkyl, cycloalkyl, aryl, alkaryl, aralkyl, heterocyclic, etc. Thus, the alkyl group may be saturated or unsaturated, straight or branched chain, substituted or unsubstituted, and may have from 1 to any desired number of carbons, of which examples are methyl, ethyl, propyl, butyl, amyl, isoamyl, hexyl, decyl, dodecyl, vinyl, propenyl, allyl propynyl, etc. The cycloalkyl group may have 3 or more carbons in the ring and may be saturated or not, substituted or not, and illustrated by such groups as cyclopropyl, cyclopentyl, cyclohexyl, cycloheptyl, etc. And so on, with the aryl, alkaryl, aralkyl, and heterocyclic groups being the same as those described above for $R_2$.

The radical $R_4$ may be the same as or different from $R_3$ and is chosen from the foregoing.

As is apparent, the number of atoms in the lactone ring is variable, depending on the value of $n$. Thus, when $n$ is 1, the compound is a beta-lactone, such as beta-propionolactone; when n is 2, the compound is a gamma-lactone, such as gamma-butyrolactone, beta, beta-dimethyl-gamma-valerolactone, alpha-methyl-beta-phenyl-gamma-decanolactone, beta-methyl-gamma-phenyl-butyrolactone, etc.; when $n$ is 3, the compound is a delta-lactone, such as delta-valerolactone; and when $n$ is 4, the compound is an epsilon-lactone, such as epsilon-caprolactone, etc. Gamma-lactone are preferred, the formula of which, with identification of positions, may be written:

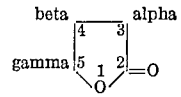

of special interest are gamma-lactones having only one substituent in the gamma or 5 position.

Referring again to the radicals $R_1$, $R_2$, $R_3$, and $R_4$, those groups containing only carbon and hydrogen may be classed as "hydrocarbyl" groups, while the term "organyl" may be used to include hydrocarbyl or heterocyclic groups. Hydrocarbyl groups containing an atom other than carbon and hydrogen may be described as hydrocarbyl-containing groups; thus, in some cases $R_2$ may contain an oxygen atom, as in the case of furfuryl acetate, where $R_2$ is furfuryl, or in the case of methyl pyruvate where $R_2$ is acetyl; or $R_2$ may contain a sulfur atom, as in the case of sulfosuccinic acid esters; or $R_2$ may have some other atom like nitrogen, etc.

It will be appreciated that a mixture of esters may be reacted to give a mixture of acids; also the starting ester, or mixture of esters, may contain one or more carboxylic acids, as may happen by reason of the preparative method used to make the ester. Similarly, a mixture of lactones may be hydrogenolyzed, and one or more carboxylic acids may be present. It is possible to subject to reaction a mixture of esters of primary, secondary, and tertiary alcohols and to secure the selective hydrogenolysis of the esters of the secondary and tertiary alcohols without hydrogenolysis of the ester of the primary alcohol. In a mixture of esters of secondary and tertiary alcohols, esters of tertiary alcohols may be selectively hydrogenolyzed without reacting the ester of the secondary alcohol. Also, a polyester of a polyhydric alcohol, containing ester groups derived from primary and secondary alcohol groups, may be reacted to selectively hydrogenlyze the ester groups derived from the secondary alcohol groups; for example, glycerol tripalmitate may be reacted to selectively give the dipalmitate ester of 1,3-dihydroxypropane ester of 1,3-dihydroxypropane and palmitic acid. Or a mixture of terminal and internal lactones may be reacted to give the selective hydrogenolysis of the internal lactone without hydrogenolysis of the terminal lactone. A terminal lactone may be illustrated as:

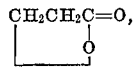

while an internal lactone may be illustrated as:

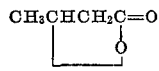

The product acid, note equations (1) and (2), may be as varied and diverse as the starting ester or lactone. Thus, the acid may be substituted or unsubstituted, and may have a straight, branched, or closed chain. It may have aliphatic, aromatic, and/or heterocyclic substituents. Owing to the present shortage of carboxylic acids, particularly relatively simple acids, and the increasing availability of lactones, the invention may help to satisfy the need for acids. Of particular interest in this invention are those ester reactants in which $R_1$, $R_2$, $R_3$ and $R_4$ of equations (1) and (2) are hydrogen or hydrocarbyl containing from 1 to about 200 carbon atoms, and preferably from 1 to about 50 carbon atoms.

The hydrogenolysis catalyst comprises dual functional catalyst system or material made up of a hydrogenation component and a solid acid-acting component.

The hydrogenation component may be a metal of Groups IB, IIB, IIIB, IVB, VB, VIB, VIIB, and VIII of the periodic system or a compound of one of said metals; preferably it is a metal and is chosen from Group VIII, particularly from the platinum series of metals. If desired, it may be supported on a non-acid support such as charcoal.

The acid-acting solid preferably comprises a cation exchange resin, a crystalline aluminosilicate, a crystalline aluminosilicate at least partially in the hydrogen form, or an acidic inorganic metal oxide like alumina, silica-alumina, thoria, vanadia, zirconia, titania, zinc oxide, chromia, chromia-alumina, silica-magnesia, molybdena-alumina, halogenated alumina, germania, ceria, molybdena, etc., and mixtures of the foregoing. Solid inorganic nonmetallic oxides, such as phosphorus pentoxide, may be of use. Also useful are sulfides like molybdenum sulfide, tungsten sulfide, iron sulfide, nickel sulfide, and other metal sulfides, including mixture of the same.

The cation exchange resin is chosen from strongly acid resins, i.e., resins having such functional groups as sulfonic acid, phenolsulfonic acid, phosphonic acid, etc. The resin matrix, to which the acid functional groups are attached, may be of any suitable type, including a phenolic type resin, a cross-linked copolymer of styrene using any available crosslinking agent, preferably a polyfunctional polymerizable monomer or partial polymer, such as a copolymer of styrene and divinylaromatic (i.e. divinylbenzene) or acrylate, polystyrene, polyacrylic acid resin, chlorinated styrene-divinylbenzene copolymer, etc. Sulfonated coal is a useful resin. Preferred resins are those which are porous or which become porous in the reaction mixture.

The crystalline aluminosilicates are known as molecular sieves and comprise natural or synthetic materials which contain aluminum and silicon in fairly definite proportions. They have a generally crystalline structure as shown by X-ray diffraction examination. In hydrated form they correspond to the general formula:

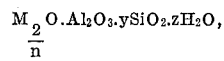

where M is a cation, $n$ is its valence, $y$ is the moles of $SiO_2$, and $z$ the moles of water of hydration. As crystalline aluminosilicates or zeolites have been widely described, and particularly in the patents and patent applications noted in the examples below, no further detailed description of them will be given, except to say that numerous types are available, one type differing from another in respect of their interatomic structures.

For purposes of the invention, useful crystalline aluminosilicates include, among others, the synthetic zeolites described in the following U.S. patents:

| Type | Patent | Type | Patent |
|---|---|---|---|
| A | 2,882,243 | T | 2,950,952 |
| B | 3,008,803 | U | 3,248,170 |
| E | 2,962,355 | W | 3,012,853 |
| F | 2,996,358 | X | 2,882,244 |
| H | 3,010,789 | Y | 3,130,007 |
| J | 3,011,869 | Z | 2,972,516 |
| L | 3,130,006 | ZK4 | 3,140,252 |
| M | 2,995,423 | ZK5 | 3,247,195 |
| Q | 2,991,151 | | |

Also suitable for the invention are modifications of the foregoing; for example type X, or any other type, exchanged by a rare earth metal, or by any other exchangeable metal. Natural zeolites are suitable, including levynite, dachiarite, offretite, faujasite, analcite, paulingite, noselite, phillipsite, brewsterite, falkite, datolite, chabazite, leucite, scaplite, mordenite, etc.

If the zeolite is to be used in hydrogen form it can, if not in such form, be converted thereto in any of various ways, some of which are described in the patents listed above and in the references noted in the examples. In such form of the zeolite, the cation M is hydrogen, or at least the zeolite is sufficiently converted to such form that it is an acid-acting material. The hydrogen form is referred to as such, or simply as the H form; thus Zeolite Y, when converted to hydrogen form, is designated Zeolite HY or HY. As one illustrative procedure, a convenient way of converting a zeolite to H form is to leach it with acid, such as HCl, rinse, and dry, thereby replacing a desired amount of the exchangeable cation M, which frequently is sodium, with hydrogen. It will be understood that some natural and synthetic zeolites are acid-acting materials and do not require to be converted to H form.

The described two-component catalyst may be used as a loose physical mixture of particles of hydrogenation component and particles of acid solid, and in in this form it is suitable for use in batch reactions carried out in an autoclave. Or both components may be incorporated in the same particle, according to any of several methods of incorporation. In one of said methods, a metal hydrogenation component is electrolessly deposited on the acid solid by mixing the latter with a solution comprising a metal pi-complex, the metal moiety of which comprises the hydrogenation component, decomposing the complex to form elemental metal, and depositing the latter on the acid solid, all as disclosed in said copending case Ser. No. 647,222 or in said copending case Ser. No. 647,221. It is to be understood that the substrate noted in these copending cases, upon which the metal is deposited, will be selected from the acid solids described herein.

In another of said methods, a compound of one of the foregoing described hydrogenation metals is chemically incorporated in a cation exchange resin to form an insoluble resin-metal compound complex, according to the procedure described in said copending case Ser. No. 672,009. The useful metal compounds are soluble coordination compounds that can form a complex cation comprising a metal and two or more ligands and having a net positive charge, as illustrated by compounds like tetraammineplatinum(II) dichloride tetra(triphenylphosphine)palladium (II) dibromide, and others as set forth in said last mentioned copending case.

In another method, a cation exchange resin is treated with a metal compound to ionically bond the same to the resin, then the metal moiety of the compound is reduced to a lower valents state, preferably to zero valent state, as described in said copending case Ser. No. 672,011. The metal compound is one able to form a complex cation having a net positive charge, such as tetraammineplatinum (II) dichloride, and others as described in said last mentioned copending case.

Another method comprises treating a cation exchange resin with a reducing agent, then with a metal compound, thereby reducing the metal moiety to zero valent metal, and obtaining a cation exchange resin having the metal chemically bonded thereto, as described in said copending case Ser. No. 672,007. The metal compound is any suitable ionic or neutral compound whose metal moiety may be any of the foregoing hydrogenation metals. Illustrative compounds are nickel acetate, sodium tetrachloropalladite(II), potassium tetranitritoplatinate(II), and others as recited in said last mentioned copending case.

Hydrogenation components, particularly metals, may be incorporated in the acid-acting zeolites by conventional methods such as ion exchange, impregnation, or the like. Some of these procedures are illustrated in the patents noted above and in those described below in the examples.

In these catalyst systems, i.e., where both components are incorporated in the same catalyst particle, the resulting catalyst may be designated a dual functional catalyst. The hydrogenation component is directly supported on the acid solid and in some cases is chemically bonded thereto. This is the preferred catalyst form, and is particularly useful in fixed bed flow reactors.

Both components of the catalyst system are necessary, as the use of one or the other by itself will not give a desired conversion, note Examples 3A and 3H. The greater the acid activity of the acid solid, the better are the conversions and selectivities. By acid activity is meant the ability of the acid solid to catalyze a known acid-catalyzed reaction, such as olefin polymerization, alkylation, and the like. Acid solids of lesser acid activity, such as alumina (Examples 10 and 11) and silica-alumina (Example 4C), although useful, give lower conversions and selectivities. As presently understood, it is most desirable that for the purpose of this invention the acid-acting component of the catalyst combination possess a high Alkylation Index, preferably of at least 100. (Note Examples 3 and 4). As defined herein, Alkylation Index shall mean the number of millimoles of an alkylate produced in a catalyzed reaction between propylene and toluene per gram of catalyst per hour. This independent reaction is used to rate the activity of the acid-acting component used in the dual-functional catalyst of this invention; it is conducted under well-defined and controlled conditions: a temperature of 100° C., with toluene in the liquid phase and propylene saturation. If an acid solid, particularly the metal oxides, does not have an acid activity which meets the foregoing definition, it may be possible to pretreat it with an acidic agent and thus impart to it an acceptable acid activity. Note Examples 10 and 11 where the chlorine-treated alumina of Example 11 gave a higher level of conversion than the untreated alumina of Example 10. Besides chlorine, other useful acidic treating agents are carbon tetrachloride, boron fluoride, halogen compounds like HCl, HBr, etc. If desired, more than one hydrogenation component may be associated with more than one acid solid.

The described reactions may, as indicated, be carried out batchwise, as in an autoclave or other suitable pressure device, or continuously, as in a fixed bed flow reactor. Generally, the ester or lactone, and also the product acid, are in the liquid phase, although vapor phase operation is possible. Temperatures may range from 25 to 400° C., preferably from 150 to 350° C.; hydrogen pressures from atomspheric to 2500 p.s.i.g., preferably from 100 to 1000 p.s.i.g.; and reaction times from a few minutes to 1 or 2 days, preferably from 1 to about 5 hours. As is apparent from equations (1) and (2), one mole of hydrogen reacts with one mole of ester or lactone; in practice an excess, preferably a slight excess, of hydrogen is used. In a flow process, the LHSV (liquid hourly space velocity) may range from about 0.1 to 20 or more, preferably 0.5 to 2, volume of ester or lactone per volume of catalyst per hour. It will be recognized that the foregoing process conditions are relatively mild.

Following completion of the reaction, separation of the product from the catalyst is accomplished easily; thus, in a batch system the reaction mixture may be filtered or decanted or centrifuged; and in a flow system the catalyst is retained in place in fixed beds while the reactants flow through the same.

Conversions of ester or lactone to carboxylic acid range as high as 99.5% and selectivities as high as 98%, note Example 4H, and on this basis the yield, which is the conversion times the selectivity, is as high as 98.5%.

The invention may be illustrated by the following examples in which, when reference is made to "y-valerolactone," it is intended to represent gamma valerolactone.

Example 1

A palladium-containing catalyst was prepared by mixing 50 g. of $PdCl_2$, 750 ml. concentrated ammonium hydroxide, and 750 ml. distilled water, heating the mixture to refluxing temperature, then cooling. The mixture was evaporated, the solids washed with absolute alcohol and ether, and filtered. The resulting complex, tetraamminepalladium(II) dichloride, $Pd(NH_3)_4Cl_2$, in an amount of 14.6 g., was dissolved in 1200 ml. distilled water and then mixed with 200 ml. of a wet sulfonated polystyrene ion-exchange resin in the sodium form. The mixture was stirred for 45 min. It was filtered, washed with distilled water, washed with ethanol and ether, and dried at 110° C. for two hours. About 45 g. of the product was mixed with 300 ml. water and 110 ml. of an 85% aqueous solution of hydrazine, and the mixture stirred at 80° C. for 40 minutes, after which it was filtered and washed with water, then with 800 ml. of 6 N HCl solution, then with 1500 ml. of 2 N HCl, then with 4000 ml. water (at which point it was chloride free), then with 1000 ml. absolute alcohol and finally with 500 ml. ether. It was dried at 110° C. for two hours. The product was the desired catalyst comprising sulfonic acid group-containing resin having zero-valent palladium incorporated within the resin matrix. Chemical analysis of this material showed it to contain on a weight basis 6.14% palladium and an acid content of about 4.3 meg./gm.

The foregoing catalyst preparation corresponds with that set forth in said copending application, Ser. No. 672,011.

Example 2

The catalyst of Example 1 was used for the hydrogenolysis of y-valerolactone. An autoclave was charged with 5 g. of catalyst and 100 ml. of y-valerolactone. The contents of the autoclave were heated to 170° C. and hydrogen was introduced to produce a pressure of 1000 p.s.i. A rapid pressure drop was observed and hydrogen was periodically added to maintain a pressure between 300 and 1000 p.s.i. After about seven hours, an aliquot of the reaction mixture was withdrawn and analyzed by vapor phase chromatography. This analysis showed that about 34% of the y-valerolactone had reacted to produce valeric acid with a selectivity of greater than 98%.

Example 3

A number of acid solid-metal combination catalysts were compared for activity and selectivity in the conversion of y-valerolactone to valeric acid. In each experiment, the catalyst and 100 ml. of y-valerolactone were charged into an autoclave, heated to 170° C., and hydrogen was introduced to produce a pressure of 1000 p.s.i. The pressure was maintained between 300 and 1000 p.s.i. by periodic addition of hydrogen. After 100 min. and 300 min. aliquot of the reaction mixture was withdrawn and analyzed by vapor phase chromatography. The type of catalysts used, their respective amounts, and the results of the reaction analysis are presented in the following table.

and germanium and z is between 0 and 20. Zeolite HZSM-4 is the hydrogen form of Zeolite ZSM-4; both these materials are described in copending application Ser. No. 722,149, filed Apr. 18, 1968.

In Nos. E, F, G, and H, Amberlyst-15 Resin is a strongly acid ion exchange resin comprising a sulfonic acid group-containing styrene-divinylbenzene copolymer.

In No. F, the catalyst comprised a loose physical mixture of the Pd-carbon component and the resin component, whereas in G and Pd component was directly supported on the resin.

In No. H, the catalyst comprised only the acid solid.

Of interest in Table 1 is the fact that a two-component catalyst is shown to be necessary; compare Nos. A and H, where only one component was used and where no valeric acid was obtained, with No. F, where a two-component catalyst gave valeric acid in 98% selectivity. When the acid component is of lower acid activity, the yield of desired product is low, as indicated by Nos. B and C, the former having an acid solid of low acid activity and the latter having a liquid acid of low acid activity; on the other hand, acid solids of high acid activity gave good conversions and selectivities, as shown by Nos. D, E, F,

TABLE 1

| Experiment No. | A | B | C | D | E | F | G | H |
|---|---|---|---|---|---|---|---|---|
| Metal catalyst amount (g.) | 5% Pd Carbon 5 | Ni 0104P, 1.5 | 5% Pd Carbon 5 | .5% Pd HZSM-4 (Zeolite) 5.0 | Ni 0104P, 1.5 | 5% Pd Carbon 5.0 | 5% Pd | |
| Acid catalyst amount (g.) | | Activated clay 5.0 | Polyphosphoric acid, 84% P$_2$O$_5$; 6% H$_2$O/ 5.4 | | Amberlyst-15 (resin) 5.0 | Amberlyst-15 (resin) 5.0 | Amberlyst-15 (resin) 5.0 | Amberlyst-15 (resin) 5.0 |
| Percent conv. at— | | | | | | | | |
| 100 min. | 0 | <1 | <5 | 11.9 | 18.0 | 18.5 | 21.0 | 0.10 |
| 300 min. | 0 | | | 25.0 | 24.7 | 46.0 | 54.0 | 0 |
| Selectivity, percent | | (¹) | <20 | 89.0 | 98.0 | 98.0 | 98.0 | 0 |
| Alkylation index of acid component | 0 | 69 | | 128.0 | 571.0 | 571.10 | 571.0 | 571.0 |

¹ Very poor.

In Table 1, the following notes are applicable:

In Expt. No. A, the catalyst comprised a commercial catalyst, palladium supported on carbon, the amount of palladium being 5% by weight of the mixture, and the carbon serving merely as a carrier. No acid component was present.

In No. B, and also in No. E, the metal component was a commercial nickel on kieselguhr catalyst, containing about 60% nickel, the latter referring to a type of nickel catalyst of reproducible activity. In B the acid solid was a commercial activated clay.

In No. C, the composition of the acid component is given.

In No. D, the acid component was a zeolite molecular sieve derived from Zeolite ZSM-4, the latter corresponding to the formula

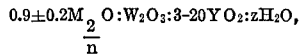

where M is cation, n is the valence of said cation, W is selected from the group consisting of aluminum and gallium, Y is selected from the group consisting of silicon and G. Acid solids having a large Alkylation Index, i.e., above 100, show good hydrogenolysis activity, whereas those with an Index below 100 do not.

Example 4

Using the same hydrogenation catalyst, a number of zeolitic and nonzeolitic acid-acting materials were compared for activity and selectivity in the conversion of y-valerolactone to valeric acid. In each experiment, 1.5 g. of 0104-P, nickel catalyst, 5.0 g. of acid-acting catalyst, and 100 cc. of y-valerolactone were charged into an autoclave, the contents heated to 250° C., and hydrogen as introduced to produce a pressure of 1000 p.s.i. The pressure was maintained between 300 and 1000 p.s.i. by periodic addition of hydrogen. After 20 min. and 100 min., aliquots of the reaction mixture were withdrawn and analyzed by vapor phase chromatography.

The catalysts used and the results of the reaction analyses are presented in the following table.

TABLE 2

| Experiment No. | A | B | C | D | E | F | G |
|---|---|---|---|---|---|---|---|
| Acid catalyst | SiO$_2$H$_3$PO$_4$ | Activated clay H+ filtrol | SiO$_2$-Al$_2$O$_3$ | Zeolite HZSM-4 | Zeolite SK500 | Zeolite REY | Zeolite HY |
| Percent conv.: | | | | | | | |
| 20 min. | | 2.3 | 14.0 | 16.0 | 37.4 | 64.9 | 63.6 |
| 100 min. | ~1 | 10.2 | 26.5 | 59.7 | 80.0 | 92.2 | 99.5 |
| Selectivity, percent | 50 | 40-70 | 79.0 | 89.0 | 98.0 | 98.0 | 98.0 |
| Alkylation index of acid component | | 69.0 | | 128.0 | 1,232.0 | 1,622.0 | ~1,400.0 |

In Table 2, the following notes are of interest:

In Expt. No. A, the acid compound was a commercial solid silico phosphoric acid catalyst commercially used for polymerization and alkylation reactions. It had a low acid activity.

In No. C, the acid component was a conventional amorphous silica-alumina (90% $SiO_2$–10% $AlO_2$) material of moderate acid activity having an activity index (referring to its cracking capability) of 46, as measured by the well-known "Cat. A" test, described in National Petroleum News *36* R–537 Aug. 2, 1944.

In No. E, Zeolite SK500 is a rare earth hydrogen Y type.

In No. F, Zeolite REY is a strongly acid, arer earth metal-containing zeolite prepared by treating Zeolite Y with a fluid medium containing at least one rare earth metal cation and a H ion or ion capable of conversion to a H ion. The procedure is illustrated in U.S. 3,140,253, particularly in Examples 10 and 20 thereof, and also in U.S. 3,254,034. Methods for introducing the nickel component, or other metal component, into a rare earth metal-containing zeolite are set forth in U.S. 3,247,099.

In No. G, the Zeolite HY is the acid form of Zeolite Y. It was of strongly acid activity and may be prepared according to procedures described in said 3,247,278 patent.

It is apparent from Table 2 that acid components of low acid activity and of Alkylation Index below 100 are inferior to components that are strongly acid and have an Akylation Index above 100. Note in particular that in Nos. F and G the yield (product of the conversion and the selectivity) was over 90% and 100 minutes, reaching 97.5% in the case of No. G.

Example 5

A REHY catalyst (comprising a rare earth metal-containing, hydrogen ion-containing Zeolite Y whose preparation is descibed for example, in U.S. 3,140,252 and 3,140,253) containing 3% nickel was prepared in the following way:

50.8 g. REHY (1.4% Na, 65.3% $SiO_2$, 21.8% $Al_2O_3$, 11.5% $RE_2O_3$, 0.4% Ce, 0.4% Ca) was added to a solution of 6.36 g. nickel acetate tetrahydrate in 150 ml. distilled water. The mixture was heated for one hour at 100° C. with occasional stirring. The water was then removed in a rotating evaporator. The catalyst was treated by heating at 550° C. in a stream of air, which was saturated with water at room temperature by bubbling it through a saturator. Before use, the catalyst pretreated with flowing hydrogen for one hour at 427° C.

Example 6

The acid solid-metal catalyst system may be used to hydrogenolysis mixtures of lactones as shown by this example. A 100-ml. mixture of $C_4$–$C_{13}$ acids and lactones in the relative concentrations of 75% acids and 25% lactones were charged into an autoclave with 2.4 g. of a catalyst of example 5 (3% nickel on REHY). Hydrogen was added to produce a pressure of 500 p.s.i. and the contents of the autoclave heated to 485° F. After 19 hrs., the autoclave was cooled and vented. Analysis of the reaction products by infrared spectroscopy showed that the lactone concentration had been reduced to less than 3%. The composition of the fatty acids mixture obtained after hydrogenation is presented below.

| Carbon number: | Weight percent |
|---|---|
| $C_4$ | 2.5 |
| $C_5$ | 6.1 |
| $C_6$ | 10.1 |
| $C_7$ | 13.5 |
| $C_8$ | 15.4 |
| $C_9$ | 15.6 |
| $C_{10}$ | 14.2 |
| $C_{11}$ | 11.7 |
| $C_{12}$ | 9.2 |
| $C_{13}$ | 1.7 |

All of the lactones in the mixture were found to be converted to about the same extent.

Example 7

A catalyst was prepared in a manner similar to that described in Example 1. The resultant material contained 1 weight percent palladium and had 4.8 meg. of sulfonic acid sites per gram of catalyst.

This catalyst was used for the hydrogenolysis of an ester. An autoclave was charged with 3.1 g. of catalyst, 10 ml. of cyclohexyl acetate and 90 cc. of methylcyclohexane as the solvent.

Hydrogen was added to give a total pressure of 800 p.s.i. and the contents of the autoclave were heated to 278° F. After about 10 min., a rapid pressure drop began and after 230 min., a sample aliquot was withdrawn from the autoclave and analyzed by vapor phase chromtography. This analysis indicated that about 90% of the cyclohexylacetate had been converted to cyclohexane and acetic acid with high selectivity.

Example 8

The catalyst of Example 7 was recovered, converted to the sodium form by ion exchange, and dried.

The resultant material was charged into an autoclave along with 10 cc. of cyclohexyl acetate and 90 cc. of methyl cyclohexane as the solvent. Hydrogen was added to give a total pressure of 795 p.s.i. and the contents of the autoclave heated to 278° F. After 27 hrs., a sample aliquot was withdrawn and analyzed by vapor phase chromatography. This analysis showed that no hydrogenolysis of cyclohexyl acetate had occurred.

Thus, comparing the results of this example with those of Example 7 shows that hydrogenolysis occurs only with an acid solid-metal combination catalyst.

Example 9

By careful selection of reaction conditions, the catalyst of Example 7 may be used for the selective hydrogenolysis of esters of secondary alcohols in presence of esters of primary alcohols. This selectivity may even be demonstrated for compounds that contain both types of ester groups within the same molecule, as described in the following example.

An autoclave was charged with 3.2 g. of catalyst, 10 ml. of 1,2-propyleneglycol diacetate, and 90 ml. methylcyclohexane as the solvent. The contents of the autoclave were heated to 212° F. and hydrogen was added to produce a pressure of 805 p.s.i. After one hour, the temperature was raised to 278° F. After 5.7 hours, a sample aliquot was withdrawn from the autoclave and analyzed by vapor phase chromatography.

This analysis showed that about 46% of the 1,2-propyleneglycol diacetate had reacted to produce primarily n-propylacetate and i-propylacetate in a respective ratio of about 36/1. Acetic acid was also formed.

Example 10

A stainless steel flow reactor was charged with 47.3 gr. of a commercial 0.6% palladium-on-alumina catalyst (Engelhard Industries). y-Valerolactone was passed over the catalyst at a liquid hourly space velocity (LHSV) of 0.5. Hydrogen was passed simultaneously and concurrently at a ratio of 2 moles of hydrogen per mole of lactone. The lactone was converted mainly to valeric acid. The influence of operating conditions on the reaction is apparent from the following data:

| Temperature, ° C. | Pressure, p.s.i.g. | Percent Conversion of lactone | Percent Selectivity to valeric acid | Yield per pass |
|---|---|---|---|---|
| 300 | 500 | 68 | 78 | 53 |
| 250 | 500 | 29 | 88 | 26 |
| 200 | 500 | 7 | 57 | 4.0 |
| 200 | 100 | 7 | 94 | 6.6 |

Example 11

The experiment of Example 10 was repeated using 43.5 gr. of a commercial 0.5% platinum-on-alumina catalyst that contained chlorine (Baker Sinclair). In comparison with Example 10, the activity was increased, presumably due to the higher acidity of the alumina, but the selectivity was reduced, presumably due to the less selective action of platinum relative to palladium. The LHSV was 0.5.

| Temperature, °C. | Pressure, p.s.i.g. | Percent Conversion | Selectivity | Yield per pass |
|---|---|---|---|---|
| 300 | 500 | 91 | 65 | 59.0 |
| 250 | 500 | 47 | 77 | 36.0 |
| 200 | 500 | 12 | 36 | 4.3 |
| 200 | Atm. | 5 | 55 | 2.8 |

Example 12

A catalyst containing 0.5% palladium on HZSM-4 was prepared and tested under the conditions of Example 10. The LHSV was 0.5, the pressure was 500 p.s.i.g. and the hydrogen-lactone mole ratio was 2.0. As shown by the data, this zeolite catalyst had a significantly higher activity and gave the desired product, valeric acid, in greater selectivity and yield than the alumina-containing catalysts of Examples 10 and 11.

| Temperature, °C. | Percent Conversion | Selectivity | Yield per pass |
|---|---|---|---|
| 300 | 98 | 87 | 85 |
| 250 | 87 | 90 | 78 |
| 200 | 21 | 86 | 18 |

Example 13

Even higher yields are obtainable with Zeolite REHY as the acid solid. Thus 23.5 g. catalyst of Example 5, consisting of 3% nickel-on-REHY zeolite, was substituted for the Pd alumina catalyst of Example 10. The pressure was maintained at 500 p.s.i.g., the temperature at 265-316° C., the hydrogen/lactone mole ratio at 2.0. Using LHSV of 0.5, 1.0, and 2.0, the lactone conversion was 98.1 to 98.8%. Valeric acid was formed with a 90.8 to 91.6% selectivity, giving a yield per pass of 89.3 to 90.5%.

Example 14

Another zeolite-containing catalyst, 0.5% palladium on HY, was prepared. 30.2 were charged to the reactor of Example 10. The conversion of γ-valerelactone to valeric acid was studied under a variety of conditions with the results given in the table; the LHSV based on the lactone was 1.0.

| Experiment | Temp., °C. | Pressure, p.s.i.g. | H²/lactone mole ratio | Percent Conversion | Selectivity |
|---|---|---|---|---|---|
| (a) | 300 | 500 | 1 | 92.3 | 87.5 |
| (b) | 250 | 500 | 1 | 49.0 | 94.9 |
| (c) | 250 | 500 | 2 | 50.8 | 95.7 |
| (d) | 250 | 1,200 | 2 | 51.5 | 94.6 |
| (e) | 250 | 1,200 | 5 | 50.1 | 95.4 |

Experiment (a) shows that high conversions of the lactone to free acid are obtainable. The experiments at 250° C. show that the activity and selectivity are hardly affected by changing the pressure or the hydrogen to lactone mole ratio.

Example 15

Into a stirred autoclave was charged 5 g. of the catalyst of Example 1 and 155 g. of glyceryl tristearate. The mixture was heated to about 150° C. and hydrogen was added to an autoclave pressure of 1000 p.s.i. The pressure was maintained for a total of 27.5 hours. At the end of this period, the reaction mixture was analyzed. The following composition was found:

| | Percent by weight |
|---|---|
| Glyceryl tristearate | 50 |
| Propylene glycol distearate | 5 |
| Propyl stearate | 22 |
| Stearic acid | 22 |

Example 16

The catalyst of Example 1 was used in the hydrogenolysis of a natural fatty oil. A 300-ml. stirred autoclave was charged with 10 g. of catalyst and 100 cc. of a mixture of 10% cottonseed oil and 90% partially hydrogenated soybean oil (manufactured by Hunt-Wesson Foods, Incorporated). The oil is understood to be composed of glyceride esters of the following fatty acids in their respective concentrations: 10% to 12% palmitic, 3% to 5% stearic, 23% to 37% oleic and 50% to 60% linoleic.

The mixture was heated to 170° C. and pressured to 1000 p.s.i. with hydrogen. Hydrogen absorption immediately began and the reaction was maintained between 750 and 1000 p.s.i. by periodic addition of hydrogen. After 18 hours, the reaction was terminated and the contents removed. The reaction product was separated from the catalyst and analyzed. It was a low melting solid (m. pt. 53° C.) with an Iodine number of less than 10. Titration of a portion of the product indicated that about 75% of the original ester carboxyl groups had been hydrogenolized to free carboxylic acids, the rest consisting of a mixture of glycerol, propylene glycol and propyl esters of fatty acids.

Example 17

Another natural fatty oil ("Mazola Oil," manufactured by Best Foods Division of CPC International Incorporated) was hydrogenolized using the catalyst of Example 1. A 300-ml. stirred autoclave was charged with 5 g. of catalyst and 100 cc. of partially hydrogenated corn oil. The oil was composed of the glyceride esters of the following fatty acids: myristic, palmitic, stearic, oleic and linoleic. The mixture was heated to 100° C. and pressured to 1000 p.s.i. with hydrogen. Hydrogen absorption immediately began and the reaction was maintained between 700 and 1000 p.s.i. by periodic addition of hydrogen. After 19 hours, the reaction mixture was heated to 170° C. for 2.6 hours. The reaction was stopped and the product separated from the catalyst. The product was a low melting solid having an Iodine number of below 10. Titration showed that 50% of the original ester carboxyl groups had been hydrogenolized, the remainder consisting of a mixture of glycerol, propylene glycol and propyl esters of fatty acids.

Examples 18 to 22

Using the flow reactor system of Example 10, a variety of esters is hydrogenolyzed using the catalyst of Example 7. The reaction conditions are temperature 350° F., hydrogen pressure 800 to 1000 p.s.i. hydrogen-to-ester mole ratio 2 to 1 and charge flow rate 0.5 volumes of ester per volume of catalyst per hour. The ester reactant and final products in the reaction mixture are tabulated below:

| Example | Ester reactant | Products acid | Hydrocarbon |
|---|---|---|---|
| 18 | 2-heptyl benzoate | Benzoic | n-Heptane. |
| 19 | 4-fluoro-2-pentyl salicylate | Salicylic | 4-fluoropentane. |
| 20 | Phenyl butyrate | Butyric | Benzene. |
| 21 | di-t-Butyl adipate | Adipic | i-Butane. |
| 22 | 2-but.-2-enyl acetate | Acetic | n-Butane. |

All reactions proceed at conversions of greater than 80% of the ester and have selectivities of greater than 90% to the corresponding carboxylic acid.

Example 23

Into a 300-ml. stirred autoclave are charged 1.5 g. of 0104-P nickel catalyst (Example 3, B and E), 5 g. of zeolite REY (Example 4, F) and 100 g. of the 9-membered lactone of 8-hydroxydecanoic acid. The contents are heated to 250° C. and hydrogen is introduced to produce a pressure of 1000 p.s.i. After 3 hours, the reaction is terminated. The product mixture contains greater than 90% decanoic acid and a minor amount of undeacted lactone.

Example 24

Into a 300-ml. autoclave are charged 5 g. of Amberlyst-15 resin (Example 3, E to H), 5 g. of palladium on carbon (Example 3, A, C and F) and 100 g. of 3-benzylphthalide. The contents are heated to 170° C. and sufficient hydrogen is introduced to bring the pressure to 1000 p.s.i. by periodic addition of hydrogen. After 6 hours, a sample aliquot is taken and analyzed. Over 50% of the starting lactone reacts to produce 2(2-phenylethyl)benzoic acid in greater than 90% selectivity.

Example 25

To illustrate how the Alkylation Index for rating each acid-acting catalyst is determined, the following reaction was carried out using Amberlyst-15 as an example.

Into a reactor flask equipped with a thermostat were charged 53 cc. (0.50 mole) of toluene. The contents were heated to 100° C. and maintained at that temperature. Propylene was introduced at the bottom of the flask through a glass frit at a flow rate of 250 cc. per minute. Then 0.2628 g. of Amberlyst-15 was introduced thus starting the reaction. After 10 minutes, a sample was taken and analyzed. The sample contained 5 mole percent of isopropyltoluene. This corresponds to 25 millimoles of alkylate per 0.2628 g. of catalyst over a 10-minute period or 571 Alkylation Index.

This procedure may be used to evaluate any of the other acid components. However, should the conversion to isopropyltoluene after 10 minutes exceed 10 mole percent, the test should be repeated using a correspondingly smaller amount of catalyst.

It will be understood that the invention is capable of obvious variations without departing from its scope.

In the light of the foregoing description, the following is claimed.

What is claimed is:

1. A method for the selective hydrogenolysis of an ester to a carboxylic acid without reduction of the carbonyl group of said ester comprising reacting said ester with hydrogen at an elevated temperature in the presence of a dual functional catalyst system comprising (1) a hydrogenation catalyst component selected from the group consisting of metals and compounds of metals of Group VIII of the Periodic System and (2) an acid acting catalyst component selected from the group consisting of a crystalline aluminosilicate zeolite and an ion-exchange resin having strongly acidic functional groups selected from the group consisting of sulfonic acid, phenylsulfonic acid and phosphonic acid and the resin is a cationic resin.

2. The method of Claim 1 wherein the ester has from 1 to 6 occurrences of the bond group

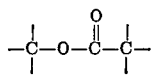

wherein the said ester is selected from the group consisting of (a)

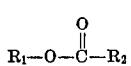

and (b)

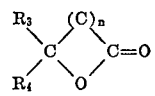

wherein $R_1$, $R_2$, $R_3$ and $R_4$ are selected from the group consisting of alkyl, alkenyl, cycloalkyl, aryl alkarly, aralkyl, heterocyclic, and said groups substituted with a noninterfering substituent selected from the group consisting of hydroxy and halogen, and, in addition, $R_3$ and $R_4$ may also be hydrogen, and $n$ is an integer of 1 to 12 and further in addition when the said ester has formula (a), one valence of the said bond group may be connected to a valence of at least one other bond group.

3. The method of Claim 2 wherein the ester is a dicarboxylate of an alkylene glycol.

4. The method of Claim 2 wherein the ester is a carboxylate of a glycerol.

5. The method of Claim 4 wherein the ester is a glyceride present in natural oils or fats.

6. The method of Claim 1 wherein the catalyst contains a metal of group VIII.

7. The method of Claim 1 wherein the acid acting catalyst component is an alkylation catalyst having an Alkylation Index, as defined, of over 100.

8. The method of Claim 1 wherein the acid acting catalyst component is a cationic ion exchange resin.

9. The method of Claim 8 wherein the ion-exchange resin consists of a resin matrix having acid functional groups attached thereto, the said matrix being selected from the group consisting of insoluble polymers and copolymers of styrene, and halogenated derivatives thereof, and the said functional group being sulfonic acid.

10. The method of Claim 1 wherein the hydrogenation catalyst component is a metal compound selected from the group consisting of tetraammineplatinum (II) dichloride, tetra (triphenylphosphine)palladium (II) dibromide, sodium tetrachloropalladite (II), potassium tetranitritoplatinate (II), tetraamminepalladium (II) dichloride, $$Pd(NH_3)_4Cl_2$$

and nickel acetate.

11. The method of Claim 1 of hydrogenolysis of an ester to a carboxylic acid product without reduction of the carbonyl group of the ester wherein said ester is an ester represented by one of the following formulas:

(1)

wherein $R_1$ and $R_2$ are alkyl or cycloalkyl or (2)
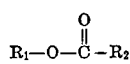

wherein $R_3$ and $R_4$ are selected from the group consisting of hydrogen, alkyl and cycloalkyl and $n$ is equal to 1 through 5 or (3) 1-2-propyleneglycol diacetate which comprises reacting said ester with hydrogen at a temperature in the functional catalyst system comprising a metal Group VIII of the periodic system or a Group VIII compound selected from the group consisting of tetraammineplatinum (II) dichloride, tetra (triphenylphosphine) palladium (II) dibromide, sodium tetra chloropalladite (II), potassium tetranitritoplatnate (II), tetraamminepalladium (II) dichloride, $Pd(NH_3)_4Cl_2$ and nickel acetate and an acid acting component of either a crystallinealuminosilicate molecular sieve or an ion exchange resin which has a functional group selected from the group consisting of sulfonic acid, phenylsulfonic acid and phosphonic acid and a matrix to which the said functional group is attached, selected from the group consisting of a phenol polymer, a copolymer of styrene and divinyl benzene polystyrene, polyacrylic acid polymer and chlorinated styrene-divinylbenzene copolymer.

12. A method according to Claim 1 wherein said acid acting component is a crystalline aluminosilicate molecular sieve.

13. A method according to Claim 1 wherein said metal is a metal of the platinum series.

14. A method according to Claim 1 wherein said metal is selected from nickel, palladium and platinum.

15. A method according to Claim 1 wherein said catalyst system comprises a loose physical mixture of said metal and said acid acting component.

16. A method according to Claim 1 wherein said catalyst system comprises a highly intimate molecular dispersion of said metal in said acid acting material.

17. A method according to Claim 1 wherein said catalyst system comprises particles in which said metal is deposited on said acid acting component.

18. A method according to Claim 1 wherein said catalyst system comprises particles in which said metal is chemically bonded to said acid acting material.

19. A method according to Claim 2 wherein $R_1$ is cyclohexyl and $R_2$ is methyl.

20. A method according to Claim 1 wherein the crystalline aluminosilicate is in the hydrogen form.

21. A method according to Claim 1 wherein the crystalline aluminosilicate is in the rare earth exchanged form.

22. The method of Claim 1 wherein the ester is an ester of a polyhydric alcohol and a monocarboxylic acid, wherein at least one of the hydroxy groups of the alcohol is esterified.

23. The method of Claim 1 wherein the carboxylic acid produced is valeric acid.

24. The method of Claim 2 wherein the ester is an ester of a monohydric alcohol and a dicarboxylic acid.

25. The method of Claim 2 wherein the ester is gamma-valerolactone.

26. The method of Claim 3 wherein the ester is 1,2-propyleneglycol diacetate.

27. The method of Claim 2 wherein the ester is 3-benzylphthalide and the reaction mixture contains 2(2-phenylethyl)benzoic acid.

References Cited

UNITED STATES PATENTS

| | | | |
|---|---|---|---|
| 3,161,674 | 12/1964 | Elam et al. | 260—540 |
| 2,484,486 | 10/1949 | Caldwell | 260—540 |
| 2,484,500 | 10/1949 | Hagemeyer, Jr. | 260—540 X |
| 3,130,237 | 4/1964 | Wald | 260—540 X |
| 2,484,497 | 10/1949 | Hagemeyer, Jr. | 260—514 R |
| 2,484,498 | 10/1949 | Hagemeyer, Jr. | 260—540 R |
| 3,176,042 | 3/1965 | Schnizer et al. | 260—526 |
| 2,936,321 | 5/1960 | Mercier | 260—541 |
| 3,116,324 | 12/1963 | Dolliver | 260—215 |

OTHER REFERENCES

The Condensed Chemical Dictionary, Reinhold Publishing Corp., 1956, p. 357.

Naves, Chem. Abstracts, Vol. 38, 4259.

Mozingo et al., Chem. Abstracts, 1948, 2242c.

J. Klein, Chem. Abstracts, Vol. 54, 338b.

ELBERT L. ROBERTS, Primary Examiner

E. G. LOVE, Assistant Examiner

U.S. Cl. X.R.

260—287, 293.88, 302, 307, 309.6, 310, 326.3, 332.2, 347.3, 514 R, 514.5, 515 R, 521 A, 526 N, 537 N, 537 R, 537 S, 539 R, 540, 541

PO-1050
(5/69)

UNITED STATES PATENT OFFICE
CERTIFICATE OF CORRECTION

Patent No. 3,849,457          Dated November 19, 1974

Inventor(s) WERNER O. HAAG and DUAYNE WHITEHURST

It is certified that error appears in the above-identified patent and that said Letters Patent are hereby corrected as shown below:

| | |
|---|---|
| Column 10, line 39 | (Table 1 percent conv. at 100 min.) Under Column "H" the figure "0.10" should read --0--. |
| Column 10, line 42 | (Table 1) "Alkylation index of acid component" under "F", the figure "571.10" should read --571.0--. |
| Column 11, line 14 | The word "arer" should read --rare--. |
| Column 15, line 9 | The word "undeacted" should read --unreacted--. |

Signed and sealed this 4th day of February 1975.

(SEAL)
Attest:

McCOY M. GIBSON JR.
Attesting Officer

C. MARSHALL DANN
Commissioner of Patents